(12) United States Patent
Murakami et al.

(10) Patent No.: US 11,340,101 B2
(45) Date of Patent: May 24, 2022

(54) CLAMP-ON ULTRASONIC FLOW MEASURING DEVICE FOR ACCURATELY POSITIONING ON AN EXISTING FLOW TUBE OF A SPECIFIC SHAPE

(71) Applicant: RYUSOK CO., LTD., Okinawa-ken (JP)

(72) Inventors: Eiichi Murakami, Okinawa-ken (JP); Yoshiaki Suzuki, Tokyo (JP)

(73) Assignee: RYUSOK CO., LTD., Okinawa-Ken (JP)

( * ) Notice: Subject to any disclaimer, the term of this patent is extended or adjusted under 35 U.S.C. 154(b) by 138 days.

(21) Appl. No.: 16/846,518

(22) Filed: Apr. 13, 2020

(65) Prior Publication Data

US 2020/0340838 A1 Oct. 29, 2020

(30) Foreign Application Priority Data

Apr. 24, 2019 (JP) .............................. JP2019-082838

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 4,454,767 A | * | 6/1984 | Shinkai | G01F 1/662 73/861.18 |
| 6,418,796 B1 | * | 7/2002 | Baumoel | G01F 1/662 73/861.27 |
| 2012/0318069 A1 | * | 12/2012 | Murakami | G01F 1/667 73/861.18 |
| 2013/0104667 A1 | * | 5/2013 | Koyano | G01F 15/14 73/861.25 |
| 2013/0180341 A1 | * | 7/2013 | Murakami | G01F 1/662 73/861.18 |
| 2019/0285450 A1 | * | 9/2019 | Tsukigi | G01F 15/14 |

FOREIGN PATENT DOCUMENTS

| | | |
|---|---|---|
| JP | 4878653 B1 | 2/2012 |
| JP | 5292522 B1 | 9/2013 |
| JP | 6454816 B1 | 1/2019 |

\* cited by examiner

*Primary Examiner* — Harshad R Patel
(74) *Attorney, Agent, or Firm* — Li & Cai Intellectual Property (USA) Office

(57) ABSTRACT

An ultrasonic flow amount measuring device includes a pair of tube holding portions respectively connected to a base by a shaft portion so as to be openable and closeable, and ultrasonic transmission and reception units disposed in the tube holding portions so as to face each other in an inclined direction. When the tube holding portions are opened so as to insert a tube between holding concave portions formed in clamping portions and closed so as to clamp the tube, front end surfaces of ultrasonic transmission bodies are in close contact with both sides of a surface of the tube. When measuring a flow amount, an ultrasonic beam is alternatively transmitted and received between the ultrasonic transmission and reception units through the tube. A flow rate is obtained by obtaining a transmission time difference between the travel time and the return time of the ultrasonic beam.

4 Claims, 4 Drawing Sheets

CLAMP-ON ULTRASONIC FLOW MEASURING DEVICE FOR ACCURATELY POSITIONING ON AN EXISTING FLOW TUBE OF A SPECIFIC SHAPE

FIELD OF THE DISCLOSURE

The present invention relates to a clamp-on type ultrasonic flow amount measuring device which is attached to the outside of a tube and transmits an ultrasonic beam to a fluid inside the tube to measure a flow amount of the fluid.

BACKGROUND OF THE DISCLOSURE

JP-A-10-221137 and JP-A-2003-75219 disclose a clamp-on type ultrasonic flow amount measuring device which is attached to the outside of an existing tube and transmits an ultrasonic beam inside the tube in an inclined direction to measure a flow amount of the fluid flowing in the tube.

SUMMARY OF THE DISCLOSURE

However, in such a clamp-on type ultrasonic flow amount measuring device, it is necessary to attach a pair of ultrasonic transmission and reception units according to the shape of the tube by a complicated and time requiring operation. For that reason, it is very difficult to promptly and accurately attach the ultrasonic flow amount measuring device to the tube for the measurement.

In order to solve the above-described problems, an object of the invention is to provide an ultrasonic flow amount measuring device which can be simply attached to an accurate position of a tube.

According to the ultrasonic flow amount measuring device of the invention, the ultrasonic flow amount measuring device can be accurately attached to the tube almost by one touch and measure the flow amount of the fluid in the tube.

DETAILED DESCRIPTION OF THE EXEMPLARY EMBODIMENTS

Figure 1:
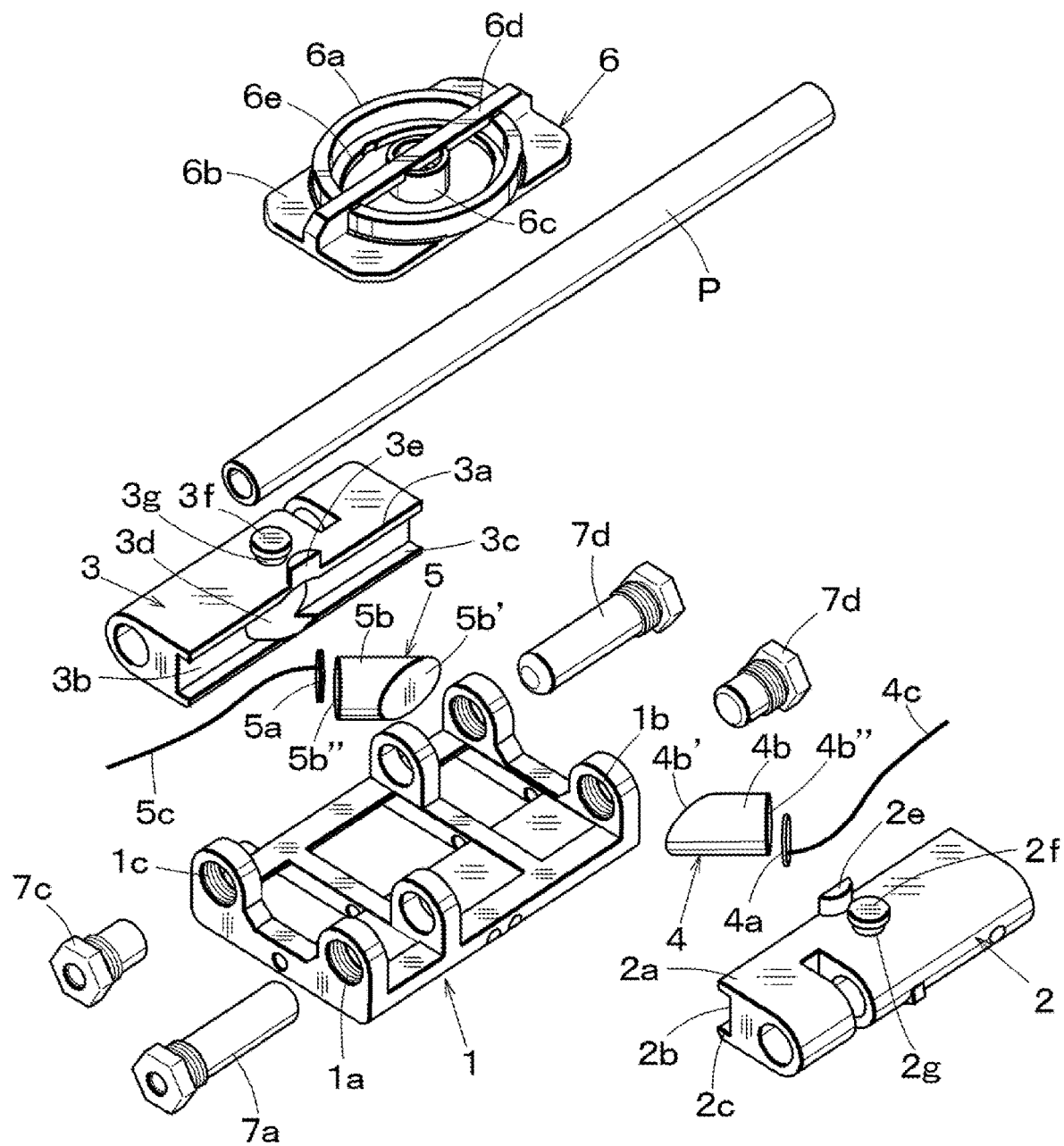
FIG. 1 is an exploded perspective view of an ultrasonic flow amount measuring device of an embodiment.

The invention will be described in detail on the basis of an embodiment illustrated in the drawings.

Figure 2:
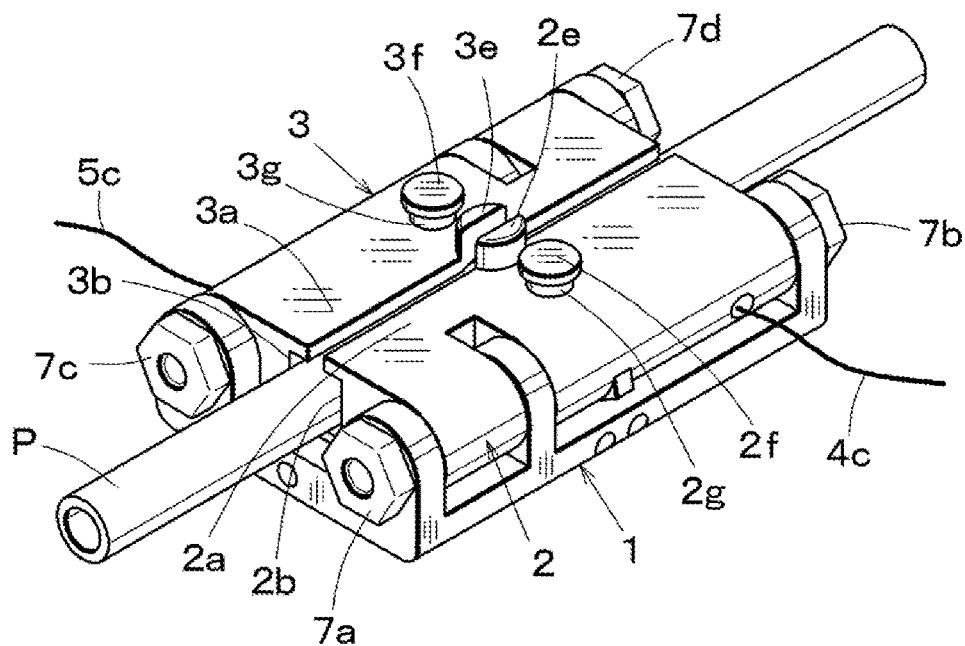
FIG. 2 is a perspective view when the device is inserted into a tube.
Figure 3:
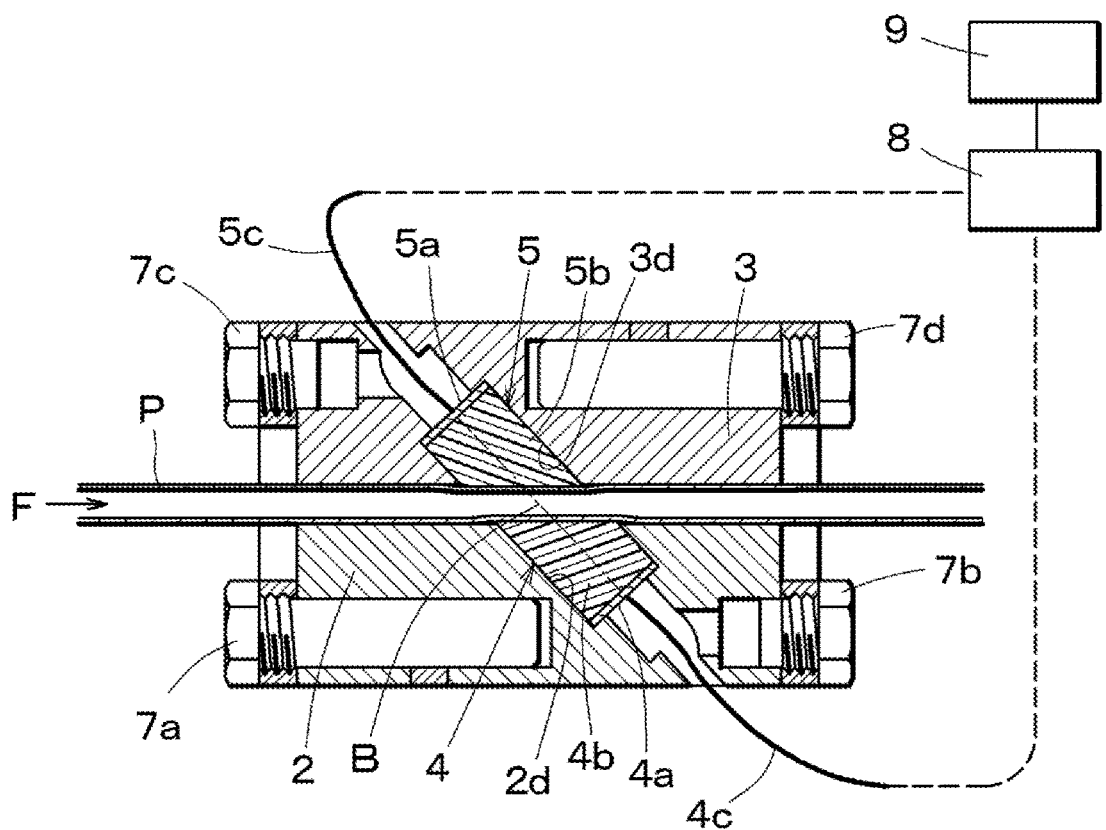
FIG. 3 is a cross-sectional view in which the device is cut in a horizontal direction.
Figure 4:
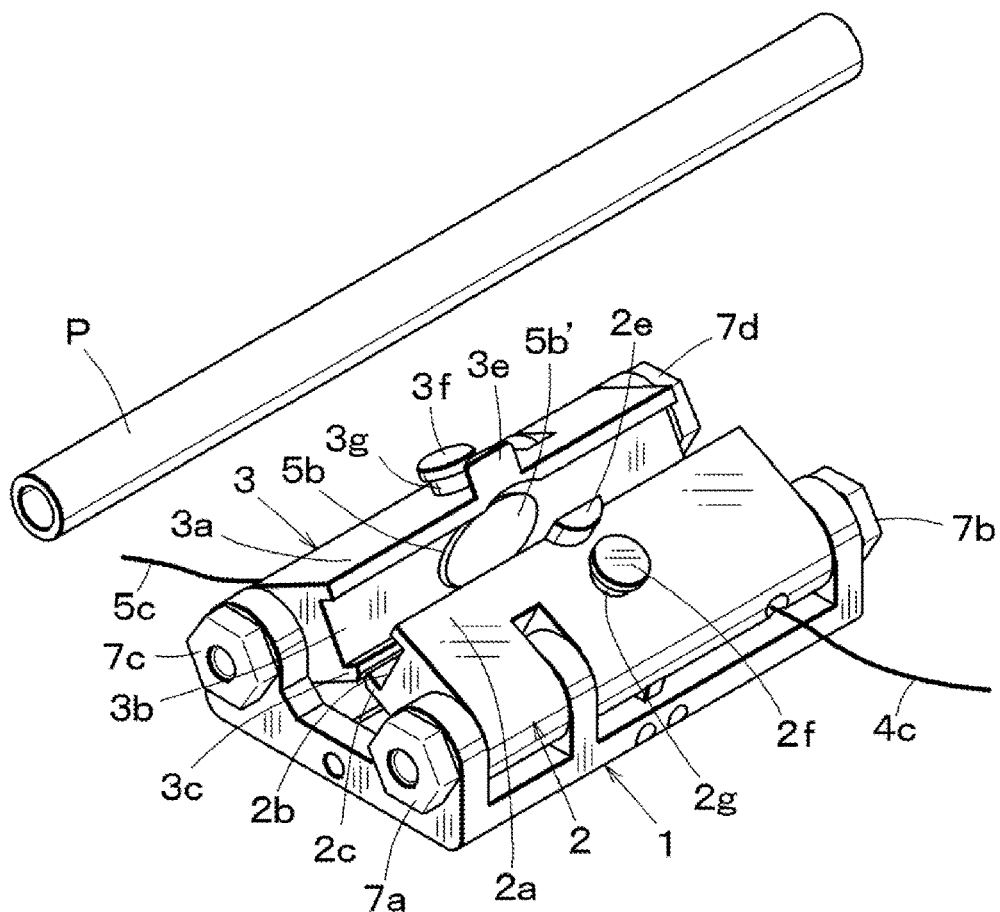
FIG. 4 is a perspective view illustrating a state in which a tube holding portion is opened.

FIG. 1 is an exploded perspective view of an ultrasonic flow amount measuring device of an embodiment, FIG. 2 is a perspective view when the device is attached to the outside of a tube, FIG. 3 is a cross-sectional view in which the device is cut in a horizontal direction, and FIG. 4 is a perspective view illustrating a state in which a tube holding portion is opened.

The ultrasonic flow amount measuring device of the embodiment mainly includes a base 1, tube holding portions 2 and 3, ultrasonic transmission and reception units 4 and 5, and a locking member 6 and these are mainly made of synthetic resin. Then, a tube P is made of a flexible synthetic resin material in which a fluid to be measured flows.

A pair of shaft holes 1$a$ and 1$b$ and a pair of shaft holes 1$c$ and 1$d$ are provided on both right and left sides of the frame-shaped base 1. Shaft portions 7$a$ to 7$d$ which are inserted through these shaft holes 1$a$ to 1$d$ are inserted into insertion holes of the pair of right and left thick plate-shaped tube holding portions 2 and 3 and the tube holding portions 2 and 3 are connected to the base 1 through the shaft portions 7$a$ to 7$d$ so as to be opened at a predetermined angle on both sides.

In a closed state of the tube holding portions 2 and 3 illustrated in FIG. 2, clamping portions 2$a$ and 3$a$ which are free edges of the tube holding portions 2 and 3 are disposed so as to face each other with a slight gap interposed therebetween. Facing surfaces of the clamping portions 2$a$ and 3$a$ in the longitudinal direction are respectively provided with holding concave portions 2$b$ and 3$b$ having a size similar to the outer diameter of the tube P and having a rectangular cross-section or a semi-circular cross-section as in the embodiment in order to hold the tube P from both sides.

Further, as illustrated in FIG. 4, lower edges 2$c$ and 3$c$ of the clamping portions 2$a$ and 3$a$ come into contact with each other while the tube holding portions 2 and 3 are opened at a predetermined angle and the tube holding portions 2 and 3 engage with each other at this position, so that the tube P can be inserted between the holding concave portions 2$b$ and 3$b$ at this opening angle.

In the tube holding portions 2 and 3, insertion holes 2$d$ and 3$d$ facing the inside of the holding concave portions 2$b$ and 3$b$ are respectively provided in an inclined direction in parallel to the surfaces of the tube holding portions 2 and 3 and the ultrasonic transmission and reception units 4 and 5 having a substantially columnar shape are inserted and fixed into the insertion holes 2$d$ and 3$d$. The ultrasonic transmission and reception units 4 and 5 are disposed to face each other in the inclined direction so that an ultrasonic beam B transmitted from the ultrasonic transmission and reception units 4 and 5 is transmitted across the tube P in the inclined direction while the tube holding portions 2 and 3 are closed.

The ultrasonic transmission and reception units 4 and 5 respectively include ultrasonic transmission and reception elements 4$a$ and 5$a$ and ultrasonic transmission bodies 4$b$ and 5$b$. The transmission and reception elements 4$a$ and 5$a$ are disc-shaped bodies configured as, for example, piezoelectric elements. The ultrasonic transmission bodies 4$b$ and 5$b$ have a cylindrical shape with a diameter larger than the diameter of the tube P and front end surfaces 4$b'$ and 5$b'$ cut in the inclined direction are transmission and reception surfaces of the ultrasonic beam B for the tube P. Rear end surfaces 4$b''$ and 5$b''$ are formed as planes in a direction orthogonal to the center lines of the columnar ultrasonic transmission bodies 4$b$ and 5$b$ and the transmission and reception elements 4$a$ and 5$a$ are attached to the rear end surfaces 4$b''$ and 5$b''$.

The front end surfaces 4$b'$ and 5$b'$ of the ultrasonic transmission bodies 4$b$ and 5$b$ slightly protrude into the holding concave portions 2$b$ and 3$b$ of the tube holding portions 2 and 3. Further, the front end surfaces 4$b'$ and 5$b'$ are formed as planes parallel to the inner surfaces of the holding concave portions 2b and 3b and are able to clamp the surface of the tube P from both sides in the inclined direction.

Lead wires 4c and 5c are connected to the transmission and reception elements 4a and 5a and the lead wires 4c and 5c are respectively drawn to the outside of the tube holding portions 2 and 3. The ultrasonic transmission and reception units 4 and 5 are connected to an arithmetic control unit 8 through the lead wires 4c and 5c and the output of the arithmetic control unit 8 is connected to a display unit 9.

Semi-circular projection halves 2e and 3e of which outer peripheries become a perfect circle when combined protrude upward on the outer surfaces of the tube holding portions 2 and 3 in the opening directions of the tube holding portions 2 and 3. Further, columnar locking projections 2f and 3f are respectively formed upright at predetermined positions on the outside of the semi-circular projection halves 2e and 3e and base portions 2g and 3g of the locking projections 2f and 3f have a small diameter.

Meanwhile, the locking member 6 having a ring shape is separately provided in order to lock the tube holding portions 2 and 3 in a closed state using the semi-circular projection halves 2e and 3e and the locking projections 2f and 3f. The locking member 6 has an elliptical ring 6a and a rectangular plate 6b is provided therearound. Further, a perfect circular ring 6c is provided at the center portion of the elliptical ring 6a and the elliptical ring 6a and the ring 6c are connected in the major axis direction of the ellipse by an upper knob 6d. Further, a flange portion 6e which engages with the base portions 2g and 3g of the locking projections 2f and 3f are formed inward at the lower portion of the elliptical ring 6a.

Additionally, the inner diameter of the flange portion 6e in the major axis direction of the ellipse of the elliptical ring 6a is larger than a distance between the outsides of the locking projections 2f and 3f while the tube holding portions 2 and 3 are closed and the inner diameter of the flange portion 6e in the minor axis of the ellipse is set to a size engaging with the base portions 2g and 3g of the locking projections 2f and 3f.

When attaching the tube P, the tube P is inserted between the holding concave portions 2b and 3b in a state in which the clamping portions 2a and 3a of the tube holding portions 2 and 3 are raised upward through the shaft portions 7a to 7d, that is, the lower edges 2c and 3c of the clamping portions 2a and 3a engage with each other so that the clamping portions 2a and 3a of the tube holding portions 2 and 3 are respectively opened at a predetermined angle as illustrated in FIG. 4.

Next, when the upper portions of the clamping portions 2a and 3a are strongly pressed downward so that the tube holding portions 2 and 3 are closed in a parallel state as illustrated in FIG. 2, a gap between the holding concave portions 2b and 3b is narrowed and the tube P is held and clamped between the holding concave portions 2b and 3b.

At this time, the front end surfaces 4b' and 5b' of the ultrasonic transmission bodies 4b and 5b of the ultrasonic transmission and reception units 4 and 5 are parallel on the plane as described above and are located inside the holding concave portions 2b and 3b so as to face each other in the inclined direction. When the tube holding portions 2 and 3 are closed so that the front end surfaces 4b' and 5b' strongly press the flexible tube P from both sides, the tube P is partially deformed into a flat shape.

In this state, since the tube P, the base 1, the tube holding portions 2 and 3, and the ultrasonic transmission bodies 4b and 5b are made of synthetic resin, the base 1, the tube holding portions 2 and 3, and the ultrasonic transmission and reception units 4 and 5 with respect to the tube P are pressed against each other and do not move due to the elastic force of the synthetic resin. However, in order to maintain the tube holding portions 2 and 3 in the closed state for a long period of time, for example, it is safer to use the locking member 6 to make the locked state.

Figure 5:
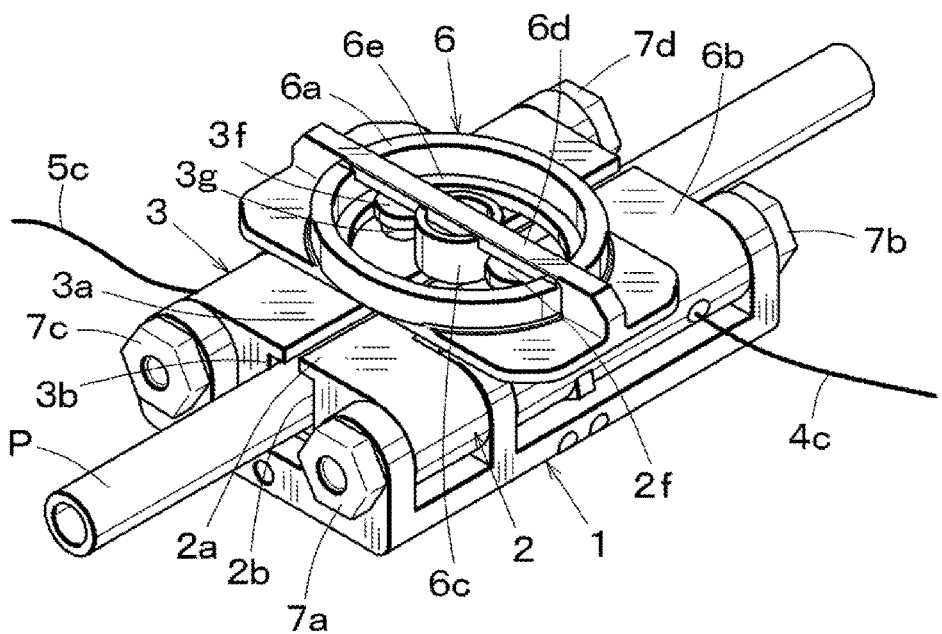
FIG. 5 is a perspective view illustrating a primary locked state by a locking member.

For this reason, it is preferable to perform a locking operation of maintaining a positional relationship of the closed state of the tube holding portions 2 and 3 with respect to the tube P using the separate locking member 6 after clamping the tube P by the tube holding portions 2 and 3. As illustrated in FIG. 5, two locking projections 2f and 3f of the tube holding portions 2 and 3 are fitted into the major axis of the ellipse of the elliptical ring 6a of the locking member 6 and the center ring 6c of the locking member 6 is fitted to the outside of the semi-circular projection halves 2e and 3e which are closed and combined with each other to form a circular shape, thereby performing a primary locking operation.

Figure 6:
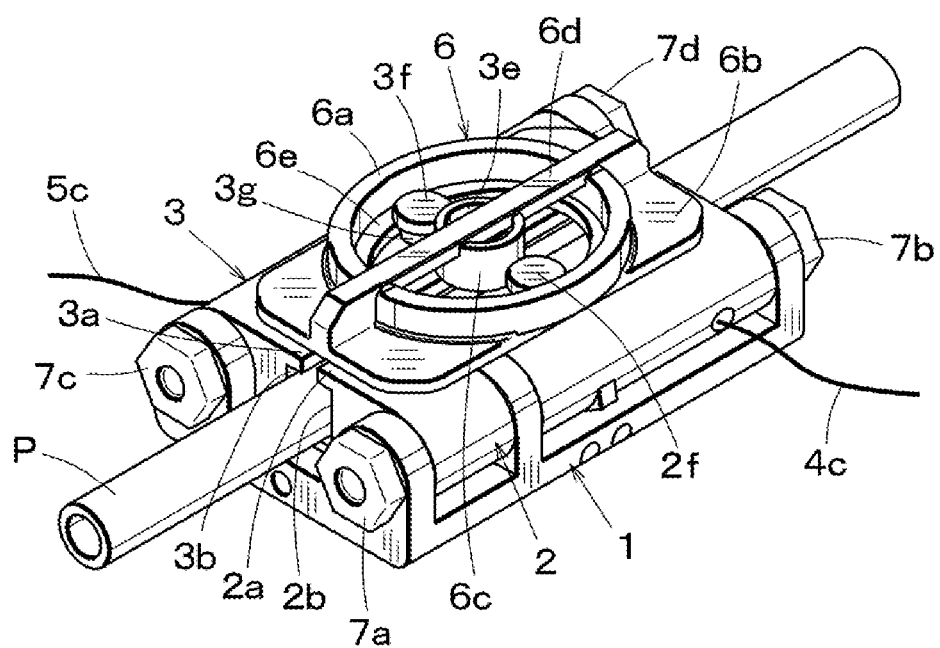
FIG. 6 is a perspective view illustrating a secondary locked state by the locking member.

Here, when the locking member 6 is rotated about the ring 6c by the knob 6d, the inner diameter of the flange portion 6e of the elliptical ring 6a sandwiching the locking projections 2f and 3f is narrowed in accordance with the rotation of the locking member 6. As illustrated in FIG. 6, when the minor axis of the ellipse of the elliptical ring 6a reaches the positions of the locking projections 2f and 3f, the flange portion 6e sandwiches the base portions 2g and 3g of the locking projections 2f and 3f.

Accordingly, the locking projections 2f and 3f are clamped by the flange portion 6e of the elliptical ring 6a, so that the tube holding portions 2 and 3 are secondarily locked. In this state, since the flange portion 6e engages with the base portions 2g and 3g, the locking mechanism will not come off accidentally unless the rotation of the locking member 6 is restored. Additionally, the locking mechanism between the tube holding portions 2 and 3 is not limited to the structure of the embodiment.

The reason why the tube P having a circular cross-section is preferred to be deformed in a flat shape during measurement is that the front end surfaces 4b' and 5b' of the ultrasonic transmission bodies 4b and 5b of the ultrasonic transmission and reception units 4 and 5 are in close contact with the surface of the tube P. In order for the ultrasonic beam B to efficiently enter and exit the tube P, the ultrasonic transmission bodies 4b and 5b need to exactly match the outer surface of the tube P. When there is a dimensional difference, a gap is formed between the tube P and the ultrasonic transmission bodies 4b and 5b so that the ultrasonic beam B cannot be transmitted properly.

In the embodiment, since the front end surfaces 4b' and 5b' are in close contact with the surface of the tube P by pressing both sides of the tube P with the planar front end surfaces 4b' and 5b' of the ultrasonic transmission bodies 4b and 5b so that the tube P is deformed in flat, the ultrasonic beam B is transmitted properly.

During the measurement of the flow amount, as illustrated in FIG. 3, a fluid F to be measured flows in the tube P. By the signal of the arithmetic control unit 8, the ultrasonic beam B of the transmission and reception elements 4a and 5a of the ultrasonic transmission and reception units 4 and 5 is alternately transmitted and received. The ultrasonic beam B travels straight in the center axis direction of the ultrasonic transmission bodies 4b and 5b and the ultrasonic beam B enters and exits the tube P in the inclined direction through the front end surfaces 4b' and 5b'. The transmitted ultrasonic beam B is transmitted obliquely across the fluid F in the tube P, is received by the transmission and reception elements 5*a* and 4*a* through the ultrasonic transmission bodies 5*b* and 4*b* on the counterpart ultrasonic transmission and reception units 5 and 4, and the received signal is input to the arithmetic control unit 8.

In this way, when the transmission and the reception of the ultrasonic beam B are alternately repeated by the ultrasonic transmission and reception units 4 and 5, the arithmetic control unit 8 obtains a transmission time difference between the time when the ultrasonic beam B reaches the downstream side from the upstream side of the fluid F and the time when the ultrasonic beam B returns from the downstream side to the upstream side. On the basis of the transmission time difference, the flow rate of the fluid F is calculated by the known method in the arithmetic control unit 8.

The arithmetic control unit 8 calculates the flow rate of the fluid F and calculates the flow amount value by multiplying the flow rate by the internal cross-sectional area of the tube P. However, since the tube P is deformed by the pressing or the like of the tube holding portions 2 and 3 and the ultrasonic transmission bodies 4*b* and 5*b*, the cross-sectional area of the tube P at the transmission position of the ultrasonic beam B is not clear in many cases. Thus, in this state, it is preferable to correct the flow amount value by allowing a predetermined flow rate in the tube P in advance. Then, the obtained flow amount value is displayed on the display unit 9.

Furthermore, in fact, since there is a tendency that the cross-sectional area of the tube P is expanded by the pressure of the fluid F when the fluid F starts to flow in the tube P, an accurate flow amount can be obtained after a slight time elapses from the time when the fluid F starts to flow.

When removing the ultrasonic flow amount measuring device from the tube P after ending the measurement, the locking member 6 may rotate to remove the locking member 6 and the tube holding portions 2 and 3 may be opened to be removed from the tube P.

Additionally, in this specification, the front to back direction, the up to down direction, and the right and left direction are descriptions for the drawings of the embodiment and actual members are not limited by these terms.

What is claimed is:

1. A clamp-on ultrasonic flow measuring device for accurately positioning on an existing flow tube of a specific shape that is attachable to and detachable from an outside of the tube in which a fluid flows and alternately transmits and receives an ultrasonic beam transmitted across the tube in an inclined direction so as to measure a flow amount of the fluid, the clamp-on ultrasonic flow measuring device comprising:

a frame-shaped base having a pair of shaft portions disposed at two side portions of the frame-shaped base;

a pair of tube holding portions that is respectively mounted to the two side portions of the base in a rotatable manner and is openable and closeable through the pair of shaft portions;

a locking member being configured to lock the pair of tube holding portions in a closed state of the tube holding portions with respect to the tube; and a pair of ultrasonic transmission and reception units that is disposed in the pair of tube holding portions so as to face each other in the inclined direction, wherein each of the pair of tube holding portions includes
a clamping portion that clamps the tube in the closed state,
a holding concave portion that is formed on an inner side of the clamping portion so as to hold and face the tube, and
a locking projection being formed upright at a predetermined position on an outer surface of the clamping portion;

each of the pair of ultrasonic transmission and reception units includes an ultrasonic transmission and reception element that transmits and receives the ultrasonic beam and an ultrasonic transmission body that allows a front end surface to be in close contact with the tube and allows a rear end surface to be in close contact with the ultrasonic transmission and reception element so that the ultrasonic beam enters and exits the tube from the inclined direction;

wherein the locking member includes an elliptical ring, the elliptical ring defines an ellipse with a minor axis and a major axis, an inner diameter along the major axis is larger than an inner diameter along the minor axis, and the elliptical ring sandwiches the locking projections of the tube holding portions in the minor axis of the ellipse by a rotation of the elliptical ring so as to lock the pair of tube holding portions in the closed state.

2. The clamp-on ultrasonic flow measuring device according to claim 1,
wherein the pair of tube holding portions are opened at a predetermined angle on both sides so that the tube is attached and detached.

3. The clamp-on ultrasonic flow measuring device according to claim 1, wherein the front end surface of the ultrasonic transmission body is formed as a plane and the front end surface slightly protrudes into the holding concave portion.

4. The clamp-on ultrasonic flow measuring device according to claim 3, wherein the front end surface of the ultrasonic transmission body presses the tube having flexibility from both sides so that the ultrasonic transmission body is deformed to be flat.

* * * * *